Figure 1:
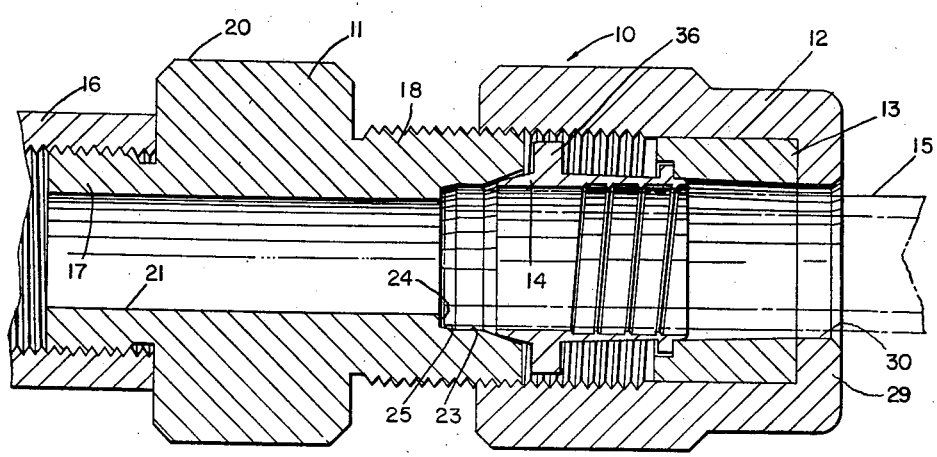

INVENTOR.
EDWARD J. CATOR
ATTORNEYS

United States Patent Office  
3,169,786  
Patented Feb. 16, 1965

3,169,786  
TUBE COUPLING WITH FRANGIBLE FERRULE  
Edward J. Cator, Rochester, N.Y., assignor to Crawford Fitting Company, Cleveland, Ohio, a corporation of Ohio  
Filed Sept. 27, 1960, Ser. No. 58,745  
2 Claims. (Cl. 285—3)

The present invention relates to tube coupling or fitting means and more particularly it relates to a fitting assembly for a tube, the tube being held in a pressure fluid tight constricting grip by the assembly.

One of the primary objects of the invention is to provide an economically manufacturable fitting for a tube of relatively small diameter that can be assembled with low torque wrenching or threading, will hold and remain leak-free at a fluid pressure beyond the yield point of the tubing, and/or can be more easily made of stainless steel and other difficult to machine materials than prior art structures.

Another object of the invention is the provision of a tube fitting of the kind referred to which comprises a minimum number of parts each part being easily formed, especially by machining.

Still another object of the invention is the provision of a tube fitting which can be easily assembled with low torque wrenching requirements, the fitting including means to effect a principal seal against pressure fluid leakage and then tightly grip the tube for preventing separation of the tube and the fitting.

Another object is to provide a fitting of the type referred to in the preceding object, in which the gripping action serves to further tighten the seal between the fitting and the tube. One of the important advantages of first effecting the principal seal and then tightly gripping the tube is that the gripping action will not interfere with the seating of the complementary principal seal surfaces by retarding the relative advancement thereof during assembly. Usually the gripping of the tube in prior art devices results in interference with the seating of the complementary sealing surfaces, and as a consequence, the fitting must be highly torqued to obtain the proper seal. In some instances, the seal cannot even be properly effected with very high torque wrenching.

Therefore, a still further object is the provision of a multi-part tube fitting especially adapted to be assembled with a tube by means of threading which requires only low torque wrenching. This is accomplished in a novel manner which includes a frangible flange designed to assure that a pressure fluid tight principal seal is effected before the flange is sheared off, which then permits the fitting to be constricted and tightly engage the tube. The gripping action prevents the separation of the tube and the fitting and further assures a pressure fluid tight connection. In other tube fittings the sealing and gripping actions take place simultaneously at two axially spaced points with the result that high torque wrenching is required due to interference from the gripping action at one point on the tube while the seal is being effected.

Yet another object is the provision of a tube fitting comprising a ferrule adapted to coact with a tube and other components of the fitting to effect a fluid tight seal therewith and to tightly grip the tube for preventing its separation from the fitting after a principal seal has been effected.

A still further object of the invention is the provision of the tube fitting, as set forth in the preceding paragraph, having a ferrule that has a helical internal ridge formed therein for tightly engaging the external periphery of the tube. The helically-shaped ridge forms an important feature of the invention in that should the principal seal between the tube and fitting be broken for any reason, the pressure fluid will be permitted to escape in metered quantities along the ridge to the atmosphere or the outside of the tube and fitting assembly. The show of pressure fluid about the exterior of the fitting and any incidental noise caused by the escaping pressure fluid will function as a bleeder and warning signal and serve notice that the principal seal has broken. The fitting can then be repaired or replaced. In this manner the danger of extrusion is minimized and substantially eliminated. The foregoing could not be as advantageously obtained if the helical ridge were replaced with an annular ridge or other means which would prevent the safety bleeder from operating. Not of the least importance is the fact that a helical ridge is more easily machined than an annular ridge.

Figure 2:
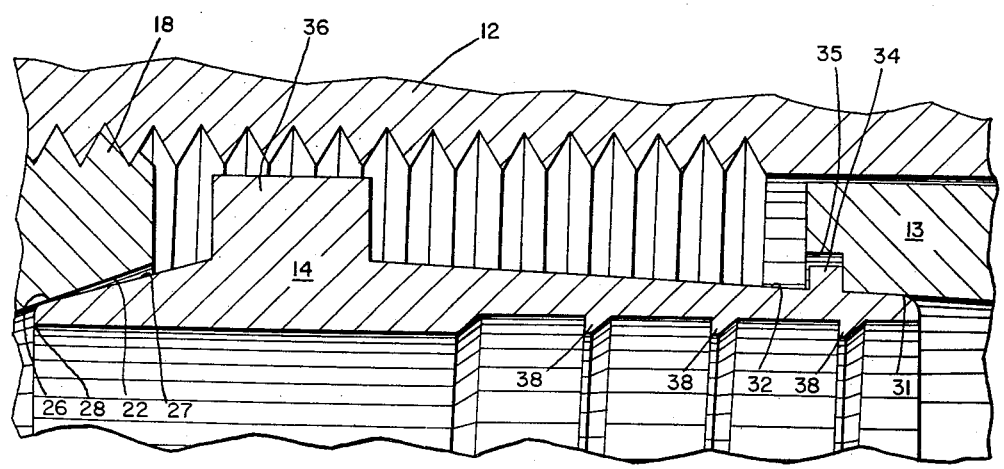

Other objects and advantages of the following construction and arrangement of parts will become apparent from the following description of a preferred form of the invention shown and described in the specification and drawing, which forms a part of the specification, and wherein similar parts are identified by like reference characters in the various views of the drawing, and wherein:

FIG. 1 is a fragmentary longitudinal sectional view of a tube fitting embodying the invention, a tube being fragmentarily shown in hidden outline; and FIG. 2 is an enlarged view of a portion of FIG. 1 for more clearly showing certain details therein.

It will be understood that the terms and phraseology appearing in the following description are for purposes of description and are not to be construed as limitations. Furthermore, it is to be understood that there is no intention to limit the claims appearing hereinafter except that which is necessary to patentably distinguish the invention over the prior art.

Referring to FIG. 1, the invention is shown embodied in a high pressure stainless steel one inch outside diameter tube fitting or coupling 10 only for the purpose of illustrating a preferred embodiment of the invention. The fitting 10 comprises a body 11, a nut 12, a sleeve 13 and a ferrule 14 disposed about a terminal end of a generally cylindrical tube 15, shown in hidden outline. The fitting 10 is adapted to connect the tube 15 to an internally threaded pipe 16 of relatively small diameter, but larger than the tube 15. (This end of the fitting may be any kind of connection and not necessarily the one described.)

More particularly, the body 11 has both of its outer terminal ends 17, 18 externally threaded for respectively threading into the pipe 16 and the nut 12. In between the ends 17, 18 is formed a hexagonally-shaped shoulder 20 of standard dimensions for purposes of permitting the body 11 to be threaded into the pipe 16 and the nut 12, which also has a hexagonally-shaped external wrenching surface. The body 11 is formed with a coaxial cylindrical opening 21 terminating in an axially and radially outwardly tapered mouth 22, FIG. 2. The mouth 22 is counterbored and thereby further provided with a cylindrical portion 23 interconnected with a radially extending annular shoulder portion 24 by means of annular fillet portion 25. The tapered portion 25 is provided as an auxiliary sealing surface complementary to the outer peripheral edge of the juxtaposed end of the tube 15 should the tube 15 be jammed against the fillet portion 25.

A principal seal is formed by moving the ferrule 14 axially to the left, FIGS. 1 and 2, by threading the nut 12 onto the shoulder 18 of the fitting body 11 and carrying with it the sleeve 13 and the ferrule 14 until a leading annular edge 26 of a tapered portion 27, of less slope than the tapered portion 22, sealingly engages the tapered portion 22. The leading edge 26 is caused to be deflected radially inwardly so that an annular sharp inner edge 28 is constricted and swages against the tube into and forms a seal between the ferrule 14 and the tube 15.

An internal annular flange 29, having a coaxial cylindrical opening 30 of greater diameter than the right hand end of the ferrule 14 and the tube 15, is adapted to engage and carry with it the generally concentric and cylindrical sleeve 13.

The sleeve 13 has a cylindrical outer periphery and a radial shoulder in juxtaposition with the nut 12, the radial shoulder being in abutment with the internal annular flange 29 of the nut. However, the inside wall 31 of the sleeve 13 is tapered in a direction opposite to the tapered portion 27 and to mate with a corresponding tapered surface 32 on the exterior right end, FIGS. 1 and 2, of the ferrule 14.

The purpose of the internal taper 31 of the sleeve 13 is to cause the ferrule 14 to be radially inwardly compressed towards the tube 15 so as to tightly peripherally grip the same and prevent it from separating from the fitting 10. Also a generally axial force vector is generated by the movement of the sleeve 13 along the tapered surface 32 of the ferrule 14 so that the principal seal is maintained, the principal seal comprising frictional engagement of the edge 26 against the tapered portion 22, FIG. 2.

One of the important features of the invention resides in the provision of a frangible annular flange 34 at the rear or right hand end, FIGS. 1 and 2, of the ferrule 14, but spaced a short distance from the rear end thereof so as to permit at least a part of the sleeve 13 to ride up on and guide along the ferrule 14.

The frangible flange 34 is of generally rectangular cross-section and of such a thickness, as measured in the direction of the tapered surface 32, as to be sheared along a substantially circular shear line at a predetermined axial load. The axial load is directly proportional to the amount of torque necessary to turn the nut 12 and cause the sleeve 13 to shear off the flange 34. The flange 34 is sheared off only under the axial load necessary to effect the principal seal; and the shearing force is applied before sufficient radially inwardly directed forces are generated to cause the deforming constriction of the ferrule 14 about the tube 15. This is to assure that the constriction of the ferrule 14 and the resulting frictional engagement thereof with the tube 15 does not interfere with the effecting of the principal seal.

The flange 34 is seated in an annular recess 35 in the left hand or forward end of the sleeve 13 for permitting the latter to properly abut against a stop 36, forming a part of the ferrule 14. The stop 36 is a generally cylindrical flange integrally connected to the middle portion of the ferrule 14 and of less diameter than the internally threaded portion of the nut 12.

The stop 36 not only serves as a stop for the sleeve 13 but also serves as a stop for the ferrule 14 relative to the terminal end of the right hand threaded portion 18 of the body 11, and to thereby limit the amount by which the sealing edge 28 can be constricted and bite into and generally indent the tube 15.

Another important feature of the invention is the formation of a generally helical ridge 38 of trapezoidal section and of several turns in the generally cylindrical coaxial opening of the ferrule 14. As the sleeve 13 is advanced to the left along the ferrule 14, the ferrule portion in juxtaposition therewith is constricted and deformed so that the ridge 38 frictionally engages and grips the tube 15. However, a positive seal does not take place between the ridge 38 and the tube 15 since pressure fluid will be metered in relative small quantities therealong to the atmosphere should the principal seal 28 be broken. This is due to the helical configuration of the ridge 38. If an annular ridge be adopted, a positive seal would be effected between the annular ridge of the ferrule and the tube and would cause extrusion or rupture of the ferrule should the principal seal 28 be broken.

Also it has been found that a helical ridge is easier to machine than an annular ridge and therefore it is more economical to manufacture the preferred form of the ferrule.

Since the ridge 38 does not have to function as a seal, but as a warning or danger signal, the ridge 38 need not be sharp-edged so as to bite into the tube periphery and thereby cause harm to and the weakening disfiguration of the tube 15.

It is desired that the fitting be capable of being easily machined since the fitting 10 is preferably of stainless steel. Stainless steel is relatively difficult to machine. Accordingly, the smaller the tooth depth of the threads in the stainless steel nut 12 and body 11, the greater is the saving in the manufacture of the fitting 10. It was found that by employing a relatively fine thread of 1 5/16–20 for the nut 12 and the body 11, the required torque to pull up the fitting was held under 200 foot-pounds with the use of a thread lubricant. In contrast, the use of a 1 5/16–12 thread size instead of the 1 5/16–20 thread size gave increased torque readings of approximately 20 percent. Therefore the use of a finer thread is two-fold in that the fitting can be manufactured more economically and less torque is required to pull up the fitting.

It will be understood that the fitting 10 could be adapted to fit over the mid-section of the tube 15 and not just at one end of the latter.

It is contemplated that other embodiments, charges, and modifications of the invention may result from the foregoing description during the use thereof, and it is intended that all such modilcations, changes and embodiments shall come within the scope of the appended claims except as precluded by the prior art.

I claim:

1. A coupling device for a generally cylindrical elongated male member, said device including a female body member provided with a generally axial male member receiving bore having an outwardly flared camming mouth, coupling nut means threadedly connected to the female body member for axial movement therealong, said coupling nut means including means forming a tapered inside wall of generally frustoconical configuration having a slope less than the slope of the flared camming mouth and forming a bore with a flared camming surface generally coaxial with the flared camming mouth of the female body, an abutment surface extending radially outwardly from said camming surface and disposed in spaced opposition to said flared camming mouth; deformable ferrule means for sealing against and gripping the male member, said ferrule means having a forward end portion and a rearward end portion, and a central axial male member receiving bore, said ferrule means having at its forward end portion a generally frustoconical external surface angled in a direction corresponding to that of the flared camming mouth of the female body but having a slope less than the slope of the flared camming mouth, said ferrule means further having a rearward tapered generally frustoconical external surface corresponding to that of the camming bore of the coupling nut means, a plurality of axially spaced, radially inwardly directed ridge means disposed circumferentially about the inner periphery of said ferrule means and extending under said rearward tapered external surface for a major portion of the length thereof, said ferrule means being clamped between the mouth of the female body member and the camming bore of the coupling nut for subsequent axial compression therebetween with the forward generally frustoconical external surface of the ferrule means being received within and engaging the flared camming mouth of the female body member for wedging coaction therewith and with the tapered rearward surface being contiguous with the camming bore for wedging coaction therewith, said ferrule means being provided on the rearward end portion thereof with a substantially annular frangible radially outwardly extending abutment means lying in a plane generally perpendicular to the longitudinal axis of the coupling and engaging the abutment surface of the coupling nut means; said frangible flange means being closely adjacent the rearmost extremity of said ridge means and separating at least a major portion of the tapered rearward surface of the ferrule means from the rearward terminus of such ferrule means, the slope of the portion of said ferrule rearwardly of said frangible means and the corresponding slope of said tapered inside wall means of said coupling nut means being so constructed and arranged that substantially all forces exerted on said frangible element and said ferrule are axially acting and establish a substantially circular shear line between said frangible element and the adjacent exterior surface of said ferrule, the shear strength of said frangible abutment means being such as to render the same capable of being sheared off under an axial load slightly greater than that required to cam the forward generally frustoconical external surface of the ferrule means radially inwardly along said flared camming mouth to deform first the forward end of the ferrule means against the surface of the male member to be coupled, whereby upon rotation of the coupling nut means the components of the device coact in the following sequence: the ferrule is placed in axial compression and the forward generally frustoconical external surface thereof coacts with the flared camming mouth of the female body member to cause said forward end to contract radially upon a male member to grippingly engage said male member and perfect a principal seal, the annular frangible abutment means is sheared from the outer surface of the ferrule means, and the rearward tapered generally frustoconical external surface of the ferrule coacts with the camming bore of the coupling nut to radially contract on said rearward portion to place the ridge means on the inner surface thereof into gripping engagement with the male member.

2. The device of claim 1 further characterized in that the radially inwardly directed ridge means disposed upon the inner periphery of said ferrule means is constructed in the form of a helical ridge which defines a helical groove constituting a bleed passage.

References Cited in the file of this patent
UNITED STATES PATENTS

| | | |
|---|---|---|
| 2,182,811 | Kocher | Dec. 12, 1939 |
| 2,351,363 | Parker | June 13, 1944 |
| 2,466,057 | Somma | Apr. 5, 1949 |
| 2,490,620 | Cole | Dec. 6, 1949 |
| 2,544,108 | Richardson | Mar. 6, 1951 |